(12) United States Patent
Yamada et al.

(10) Patent No.: US 8,370,012 B2
(45) Date of Patent: Feb. 5, 2013

(54) DRIVE CONTROL APPARATUS FOR HYBRID VEHICLE

(75) Inventors: Kazunao Yamada, Toyota (JP); Yusuke Mizuno, Anjo (JP); Tadashi Sakai, Obu (JP)

(73) Assignee: DENSO CORPORATION, Kariya (JP)

( * ) Notice: Subject to any disclaimer, the term of this patent is extended or adjusted under 35 U.S.C. 154(b) by 630 days.

(21) Appl. No.: 12/592,876

(22) Filed: Dec. 3, 2009

(65) Prior Publication Data
US 2010/0152937 A1 Jun. 17, 2010

(30) Foreign Application Priority Data
Dec. 11, 2008 (JP) .................................. 2008-315597

(51) Int. Cl.
*B60L 11/00* (2006.01)
(52) U.S. Cl. ....................... 701/22; 180/65.21
(58) Field of Classification Search ............... 701/22; 180/65.1, 65.21; 700/291
See application file for complete search history.

(56) References Cited

U.S. PATENT DOCUMENTS

| 6,314,347 | B1 | 11/2001 | Kuroda et al. | |
|---|---|---|---|---|
| 6,823,252 | B2 * | 11/2004 | Ito et al. | 701/82 |
| 7,779,943 | B2 * | 8/2010 | Seidel et al. | 180/65.29 |
| 8,214,122 | B2 * | 7/2012 | Krupadanam et al. | 701/79 |
| 8,229,611 | B2 * | 7/2012 | Yamada | 701/22 |
| 2006/0005736 | A1 * | 1/2006 | Kumar | 105/1.4 |
| 2010/0131139 | A1 * | 5/2010 | Sakai et al. | 701/22 |

FOREIGN PATENT DOCUMENTS

| JP | 2000-333305 | 11/2000 |
|---|---|---|
| JP | 2001-183150 | 7/2001 |
| JP | 2007-050888 | 3/2007 |
| JP | 2009-179215 | 8/2009 |

OTHER PUBLICATIONS

"New Energy Automobile Development and Material", pp. 123-124, published by CMC Publication, 2006.

* cited by examiner

*Primary Examiner* — Russell Frejd
(74) *Attorney, Agent, or Firm* — Harness, Dickey & Pierce, PLC

(57) ABSTRACT

In a hybrid vehicle, an ECU collects data of (i) an amount of acquisition electrical power acquired when regeneratively charging a battery and (ii) an amount of requirement electrical power required for operating a motor, for every road section in association with a travel of the vehicle, and records the collected data in a storage device. Thereafter, when a travel course the vehicle is going to travel includes a road section where the amount of acquisition electrical power is greater than an acquisition-related threshold value or a road section where the amount of requirement electrical power is greater than a requirement-related threshold value, a re-plan of a control schedule for the engine and the motor is executed. In contrast, when the travel course does not include such a road section, a re-plan of the control schedule is prohibited.

12 Claims, 10 Drawing Sheets

FIG. 3

| | GRAD. | ACQ. REGENERATION | REQ. EL. POWER | SPEED | STOP LINES |
|---|---|---|---|---|---|
| N TRAVELS (AVERAGE) | 0.5% | 2kws | 5kws | 40km/h | 1 |
| | GRAD. | ACQ. REGENERATION | REQ. EL. POWER | SPEED | STOP LINES |
| N TRAVELS (ACCUMULATE) | 0.5%<br>0.7%<br>0.3%<br>・・ | 2kws<br>1kws<br>2kws<br>・・ | 5kws<br>6kws<br>4kws<br>・・ | 42km/h<br>38km/h<br>40km/h<br>・・ | 1<br>1<br>1<br>・・ |

DRIVE CONTROL APPARATUS FOR HYBRID VEHICLE

CROSS REFERENCE TO RELATED APPLICATION

The present application is based on and incorporates herein by reference Japanese Patent Application No. 2008-315597 filed on Dec. 11, 2008.

FIELD OF THE INVENTION

The present invention relates to a drive control apparatus of a hybrid vehicle.

BACKGROUND OF THE INVENTION

[Patent document 1] JP-2000-333305 A (U.S. Pat. No. 6,314,347)
[Patent document 2] JP-2007-50888 A A hybrid vehicle uses an engine and a motor together as a power source. In order to minimize a fuel consumption in response to road states of a route to a destination, an operation schedule of the engine and motor is set up, and a drive control is made to the engine and motor based on the set-up operation schedule (for example, refer to Patent document 1). In the preceding technology, the driving schedule is reset when the vehicle deviates from the route. In contrast, when the vehicle cannot travel to meet the set-up operation schedule because of the unexpected traffic congestion etc., the reset of the operation schedule is not executed.

To that end, SOC (State Of Charge) is detected which illustrates an amount of accumulated charge of the battery for driving the motor. When the difference between present SOC and planned SOC, which is included in the operation schedule, exceeds a threshold value, the operation schedule is re-set up from the present position of the vehicle to the destination (for example, refer to Patent document 2).

In the technology in Patent document 2, however, when the difference between the present SOC and the planned SOC exceeds the threshold value, the re-set of the operation schedule is executed. The re-set of the operation schedule is executed regardless of topographical conditions and travel conditions of the travel course, the travel conditions before reaching the spot, etc. Thus, there is a possibility that may pose a problem to worsen a gas mileage or fuel consumption, on the contrary.

SUMMARY OF THE INVENTION

The present invention is made in view of the problem above. It is an object to improve a fuel consumption in a hybrid vehicle that executes a drive control of an internal combustion engine and a motor based on a planned operation schedule.

To achieve the above object, according to an example of the present invention, a drive control apparatus for a hybrid vehicle, which travels using an internal combustion engine and a motor as power sources for a travel, is provided as follows. The apparatus executes a drive control of the internal combustion engine and the motor according to a planned control schedule. In the apparatus, a travel information record section is configured (i) to collect in association with a travel of the vehicle an amount of acquisition electrical power, which is acquired when regeneratively charging a battery to drive the motor, for every predetermined road section and (ii) to record in a storage device the collected amount of acquisition electrical power for every predetermined road section. An acquisition power determination section is configured (i) to acquire from the storage device an amount of acquisition electrical power relative to each of road sections included in a planned travel course, which is specified by the planned control schedule, and (ii) to make an acquisition determination as to whether the planned travel course includes a road section where an amount of acquisition electrical power is greater than an acquisition-related threshold value. A drive management section is configured (i) to make a reconsideration of the drive control, which is to be executed according to the planned control schedule, when it is determined that the planned travel course includes the road section where the amount of acquisition electrical power is greater than the acquisition-related threshold value, and (ii) to prohibit the reconsideration of the drive control, which is to be executed according to the planned control schedule, when it is determined that the planned travel course includes no road section where the amount of acquisition electrical power is greater than the acquisition-related threshold value.

According to an example of the present invention, a drive control apparatus for a hybrid vehicle, which travels using an internal combustion engine and a motor as power sources for a travel, is provided as follows. The apparatus executes a drive control of the internal combustion engine and the motor according to a planned control schedule. In the apparatus, a travel information record section is configured (i) to collect in association with a travel of the vehicle an amount of requirement electrical power, which is required when the battery is used as the power source, for every predetermined road section and (ii) to record in a storage device the collected amount of requirement electrical power for every predetermined road section. A requirement power determination section is configured (i) to acquire from the storage device an amount of requirement electrical power relative to each of road sections included in a planned travel course, which is specified by the planned control schedule, and (ii) to make a requirement determination as to whether the planned travel course includes a road section where an amount of requirement electrical power is greater than a requirement-related threshold value. A drive management section is configured (i) to make a reconsideration of the drive control, which is to be executed according to the planned control schedule, when it is determined that the planned travel course includes the road section where the amount of requirement electrical power is greater than the requirement-related threshold value, and (ii) to prohibit the reconsideration of the drive control, which is to be executed according to the planned control schedule, when it is determined that the planned travel course includes no road section where the amount of requirement electrical power is greater than the requirement-related threshold value.

Further, according to an example of the present invention, a drive control apparatus for a hybrid vehicle, which travels using an internal combustion engine and a motor as power sources for a travel, is provided as follows. The apparatus executes a drive control of the internal combustion engine and the motor according to a planned control schedule in association with a travel course. In the apparatus, a speed detector is configured to detect a speed of the vehicle. A travel information record section is configured to collect a speed of the vehicle every predetermined road section in association with a travel of the vehicle and record the collected speeds in a storage device. A speed determination section is configured to make a speed determination during traveling the travel course as to whether a difference between (i) a speed presently detected in a road section by the speed detector and (ii) a past speed, which is recorded in the storage device with respect to the identical road section, is greater than a predetermined speed-related threshold value. A drive management section is configured (i) to make a reconsideration of the drive control, which is to be executed according to the planned control schedule, when the speed determination section determines that the difference between the speed presently detected by the speed detector and the past speed recorded in the storage device with respect to the identical road section is greater than the speed-related threshold value, and (ii) to prohibit a reconsideration of the drive control, which is to be executed according to the planned control schedule, when the speed determination section determines that the difference between the speed detected presently by the speed detector and the past speed recorded in the storage device with respect to the identical road section is not greater than the speed-related threshold value.

BRIEF DESCRIPTION OF THE DRAWINGS

The above and other objects, features, and advantages of the present invention will become more apparent from the following detailed description made with reference to the accompanying drawings. In the drawings:

FIG. 3 is a diagram explaining travel information recorded in a durable storage medium;

DETAILED DESCRIPTION OF THE PREFERRED EMBODIMENTS

First Embodiment

Figure 1:
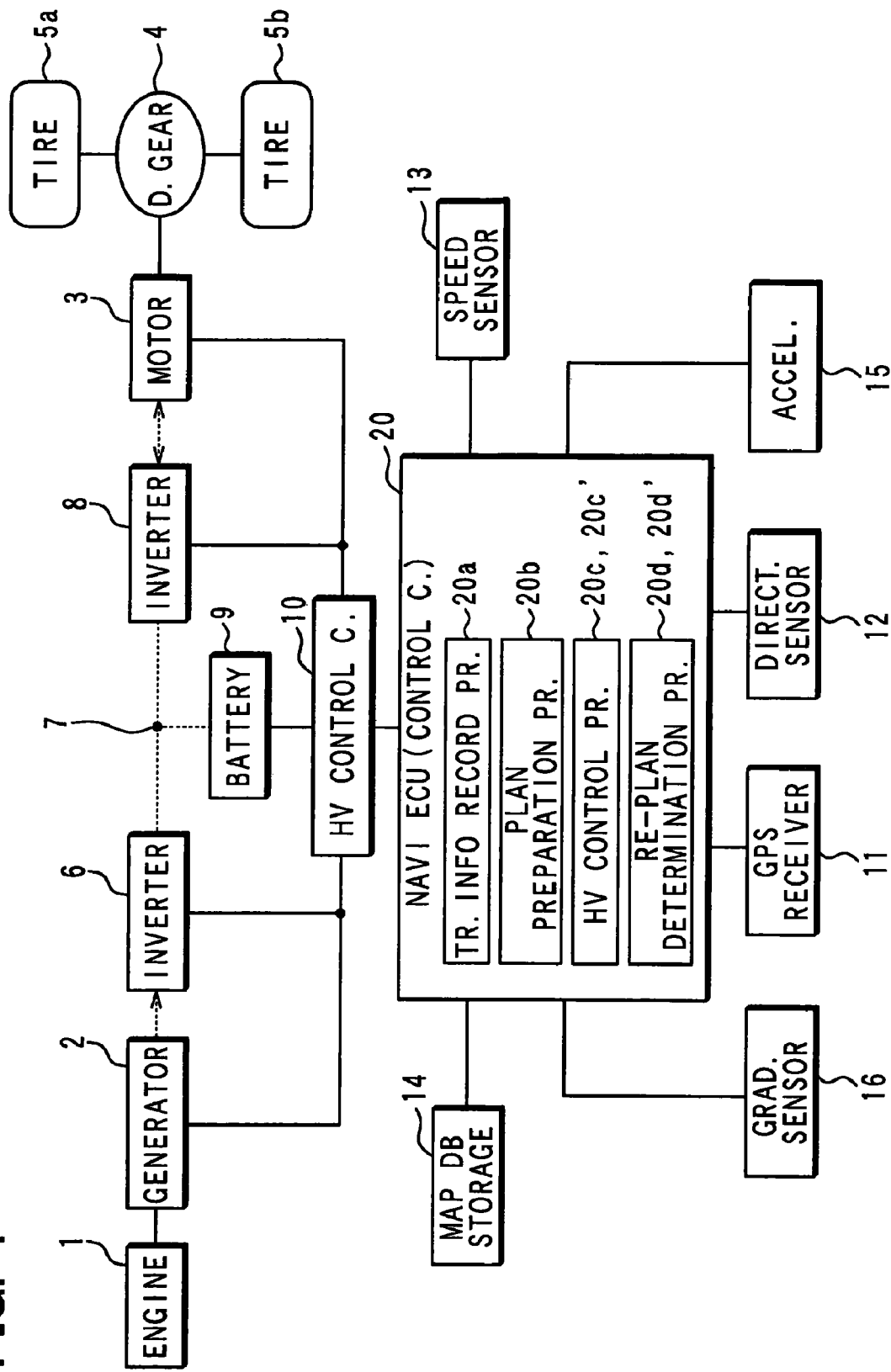
FIG. 1 is a diagram illustrating an schematic configuration of a drive control apparatus of a hybrid vehicle according to a first embodiment of the present invention.

According to a first embodiment of the present invention, a drive control apparatus of a hybrid vehicle is explained with reference to the drawings. The schematic configuration of the drive control apparatus is illustrated in FIG. 1. The hybrid vehicle includes an engine 1 as an internal combustion engine 1, an electrical generator 2, a motor 3, a differential gear device 4, a tire 5a, a tire 5b, an inverter 6, a DC link 7, an inverter 8, a battery 9, an HV control circuit 10, a GPS receiver 11, a direction sensor 12, a vehicle speed sensor 13 functioning as a speed detector, a map DB storage device 14, an acceleration sensor 15, a gradient sensor 16, and a navigation control circuit (also referred to as a navigation ECU) 20.

The hybrid vehicle runs using the engine 1 and the motor 3 as a power source. When the engine 1 is used as the power source, a rotation of the engine 1 is transmitted to the tires 5a and 5b via an unshown clutch mechanism and the differential gear device 4. When the motor 3 is used as the power source, a direct current of the battery 9 is converted into an alternating power via the DC link 7 and the inverter 8. The motor 3 operates on the alternating power. A rotation of the motor 3 is transmitted to the tires 5a and 5b via the differential gear device 4. The vehicle travel or traveling only using the engine 1 as the power source is referred to as an engine travel or traveling. The vehicle travel or traveling using at least the motor 3 as the power source including or excluding the engine 1 is referred to an assistance travel or traveling.

The rotation of the engine 1 is also transmitted to the electrical generator 2. The rotation causes the electrical generator 2 to generate an alternating power. The generated alternating power is converted into a direct power via the inverter 6 and the DC link 7. The direct current power can be charged in the battery 9. That is, the engine 1 operating by using fuel can charge the battery 9. This type of charging is hereafter referred to as internal combustion charging.

When an unshown braking mechanism decelerates the hybrid vehicle, a resisting force during the deceleration is added as a torque to the motor 3. The torque allows the motor 3 to generate an alternating power. The generated alternating power is converted into a direct power via the inverter 8 and the DC link 7. The direct power is charged in the battery 9. In the following description, this type of charging is referred to as regeneration charging.

In accordance with an instruction signal from the navigation ECU 20 or the like, the HV control circuit 10 controls whether or not to operate the electrical generator 2, the motor 3, the inverters 6 and 8, and the battery 9. The HV control circuit 10 may use a microcomputer or hardware device having a dedicated circuit configuration for embodying the following functions.

For example, the HV control circuit 10 records or stores two values, that is, a present SOC (State Of Charge) and a reference SOC (equivalent to an example of reference remaining amount). The HV control circuit 10 performs the following processes (A) and (B).

(A) The HV control circuit 10 changes the reference SOC based on the control target value (planned SOC) which is a control index inputted from the navigation ECU 20, and controls the electrical generator 2, the motor 3, the inverter 6, the inverter 8, the battery 9, etc. so that an amount of charge of the battery 9 of the hybrid vehicle closely approaches the planned SOC.

(B) The HV control circuit 10 periodically reports the present SOC to the navigation ECU 20.

The SOC (State of Charge) is an index for indicating the remaining battery amount. A higher value indicates a greater (or larger) remaining amount. The present SOC indicates the SOC of the battery 9 at the present time. The HV control circuit 10 repeatedly updates the present SOC value by successively detecting states of the battery 9. The reference SOC is a control target value (for example, 60%) which is used for the HV control circuit 10 to determine either power generation or assistance. The control target value can be changed by the control or instruction signal from the navigation ECU 20.

The HV control circuit 10 switches travel modes for the hybrid vehicle between the internal combustion travel (i.e., engine travel) and the assistance travel, based on a control target value inputted from the navigation ECU 20. The HV control circuit 10 also provides a control as to whether or not to execute the internal combustion charging or a control as to whether or not to execute the regeneration charging. The control target value in the present embodiment is a planned SOC. The HV control circuit 10 determines a travel method such that the present SOC is maintained in or around the planned SOC and controls the actuators based on the determined travel method.

The GPS receiver 11, the direction sensor 12, and the vehicle speed sensor 13 are known sensors that are used to respectively detect a position, heading direction, and speed of the hybrid vehicle. The gradient sensor 16 is a well-known sensor for specifying a gradient (i.e., a vertical (up and down) gradient) of a road. The map DB storage device 14 is a storage medium for storing map data. The acceleration sensor 15 is a known sensor for detecting a vehicle acceleration.

The map data contains (i) node data corresponding to each of intersections and (ii) link data corresponding to each link, that is, a road path connecting intersections with each other. The node data contain, with respect to each node, an identification number, location information, and type information. The link data contains, with respect to each link, an identification number (also referred to as a link ID), location information, and type information.

The position information about the link contains (i) location data of shape supplementing points contained in the link, (ii) data of the nodes located in the both ends of the link, and (iii) data of segments connecting two adjacent shape supplementing points. Each data of the segments contains information such as a segment ID of each segment, a (vertical) gradient, a direction, and a length of the segment.

The navigation ECU 20 includes a computer having a RAM, a ROM, a durable storage medium in which data writing is possible, and a CPU (none unshown). The durable storage medium can continuously maintain data even when a supply of main power to the navigation ECU 20 stops. The durable storage medium represents, for example, (i) a nonvolatile storage media such as hard disk drive, flash memory, and EEPROM, and (ii) a backup RAM. Further, the durable storage medium may be referred to as a backup memory.

The CPU in the navigation ECU 20 executes various processes according to a program stored in the ROM or durable storage medium. Such processes by the navigation ECU 20 include a map matching process for determining on which road in the map of the map DB storage device 14 the vehicle is presently located based on the position information etc. acquired from the GPS receiver 11, the direction sensor 12, the speed sensor 13, and the acceleration sensor 15; a route calculation process for determining an optimum travel route or guidance route to a destination designated by a user via an operation input device (not shown); and a navigation process for executing a travel guide along a travel route to a destination. In other words, the navigation ECU 20 may function as a map matching section or means, a route retrieval section or means, and a navigation section or means.

In the present embodiment, the navigation ECU 20 further executes the following: a travel information record process 20*a* that collects travel information for specifying a control index later mentioned in association with a travel of the vehicle every predetermined or fixed travel distance or predetermined road section, and records the collected travel information in the durable storage medium; a plan preparation process 20*b* which plans a control schedule about a route from a departure point to a destination based on the travel information recorded in the durable storage medium, and records the planned control schedule in the durable storage medium; and an HV management (or control) process 20*c* which executes a drive control of the engine 1 and the motor 3 according to the control schedule recorded in the durable storage medium. The following explains the processes, respectively.

First, the travel information record process 20*a* by the navigation ECU 20 is explained with reference to FIG. 2. When an ignition switch of the vehicle is turned into an ON state, the navigation ECU 20 comes to be in an operating state and executes a flowchart in FIG. 2. It is noted that a flowchart or the processing of the flowchart in the present application includes sections (also referred to as steps), which are represented, for instance, as S100. Furthermore, it is assumed in the present embodiment that (i) the destination is designated according to a user's operation; (ii) the guidance route from the present position of the vehicle to the destination is retrieved; and (iii) the vehicle travels or runs along the retrieved guidance route, which is also referred to as a planned travel course.

Figure 2:
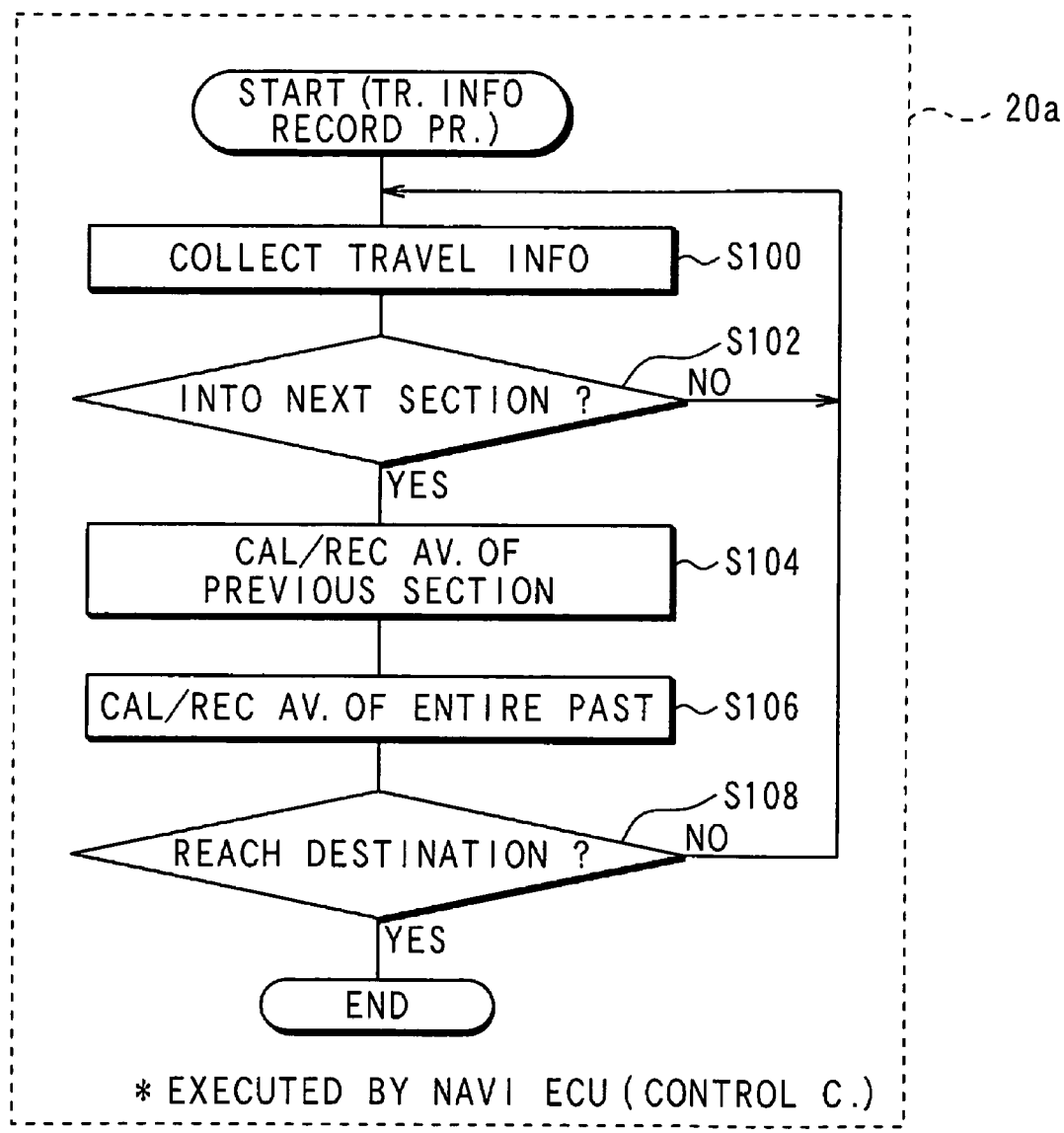
FIG. 2 is a flowchart diagram illustrating a travel information record process by a navigation ECU.

First, at S100 (i.e., Section or Step 100) of the flowchart in FIG. 2, the navigation ECU 20 collects travel information within a road section (also referred to as a travel section), in which the vehicle is presently located, periodically, and records the collected travel information in the RAM in a time-based order. In the present embodiment, travel information is collected every predetermined travel distance (for instance, every 10 meter distance). Furthermore, the travel information includes, as travel information items, a road gradient (naturally (up and down) gradient being formed on a vertical plane), an amount of acquisition regeneration (i.e., an amount of acquisition electrical power amount or an acquisition electrical power amount), an amount of EV travel requirement electrical power (i.e., a requirement electrical power amount or an amount of requirement electrical power), a speed, and the number of temporary stops or halts. Furthermore, the amount of acquisition regeneration is an electrical power amount acquired when the regeneration charging of the battery 9 for driving the motor 3 is carried out, and the amount of EV travel requirement electrical power is an electrical power amount which the motor 3 requires when the vehicle travels using the motor 3 as a power source. Furthermore, a voltage and electrical current due to regeneration charge, and a charging time are measured; the acquisition regeneration amount can be calculated as measured electrical current×voltage×charging time. In addition, an electric current flowing in the motor 3, a voltage between terminals of the battery 9, and a travel time are measured; the amount of EV travel requirement electrical power can be calculated as the measured electrical current×voltage between terminals× travel, time. In addition, the number of the temporary stops can be specified by extracting, from the map data, information which illustrates a halt line on travel roads the vehicle traveled.

Next, at S102, it is determined whether the vehicle is moved into an adjacent or next road section. For instance, it is determined on which road in the map of the map DB storage device 14 the vehicle is presently located; at the same time, it is determined whether the vehicle is moved into the next road section.

When the vehicle is not moved into the next road section, the determination at S102 is negated as NO, thereby repeating the determination at S100.

In contrast, when the vehicle is moved into the next road section, the determination at S102 is affirmed as YES. Next, at S104, an average value relative to the travel information in the previous road section is calculated and recorded in the durable storage medium. For instance, the respective travel information items, which were collected in the previous road section and recorded in the RAM are read out; then, an average of each travel information item is calculated and recorded in the durable storage medium. In addition, the travel information in the previous road section store in the RAM is eliminated and the oldest travel information stored in the durable storage medium is also eliminated.

Next, at S106, the average value of the travel information in the previous road section is calculated based on (i) the presently calculated average value and (ii) the average values of the travel information collected in the past; then, the obtained average value relative to the previous road section is stored in the durable storage medium. In other words, the average value of each travel information item associated with the number of times of historical travels is calculated, based on (i) the average value of each travel information item collected presently and (ii) the average values collected in the past. The obtained average value of each travel information item is recorded as the new average value in the durable storage medium.

Next, at S108, it is determined whether the vehicle arrives at the destination based on whether the vehicle is located within a predetermined range from the destination. When the vehicle does not arrive at the destination, the determination at S108 is negated as NO, returning the processing to S100. Thus, the processing in S100 to S106 is repeatedly executed until the vehicle arrives at the destination. Each travel information item relative to each road section in the travel course up to the destination is collected in association with the travel of the vehicle; the accumulated data of each travel information item relative to each road section are accumulated with the new travel information collected newly added in the durable storage medium.

An example of the average value and accumulated data of the N times travels relative to a certain road section, which are recorded in the durable storage medium, is illustrated in FIG. 3. As thus illustrated, the travel information or travel information items include gradient, acquisition regeneration amount, EV travel requirement electrical power amount, vehicle speed, the number of temporary stop lines; the total average values and accumulated data with respect to N-times travels are recorded in the durable storage medium.

Figure 4:
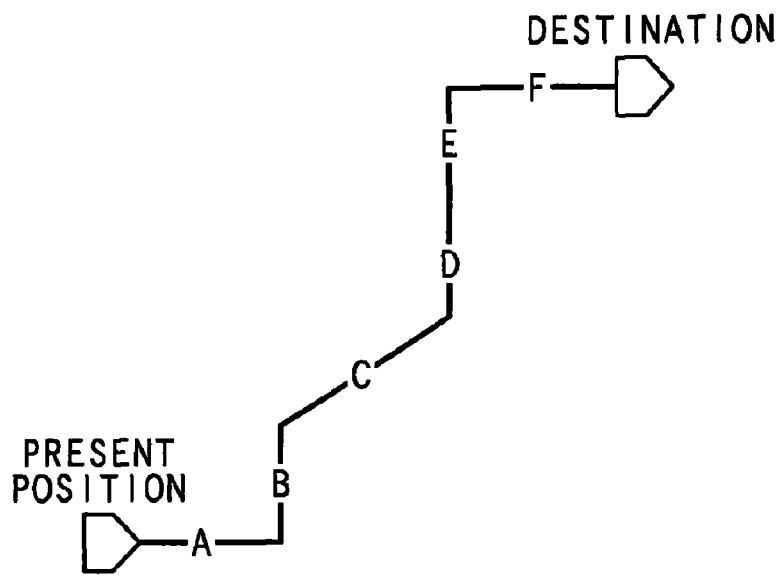
FIG. 4 is a diagram explaining road sections in association with travel information stored in the durable storage medium.

For instance, as illustrated in FIG. 4, the present travel course includes the sections A to F from the present position to the destination. With respect to each of the sections A to F, the travel information items are collected and accumulated in the durable storage medium.

Returning to FIG. 2, when the vehicle arrives at the destination, the determination at S108 is affirmed as YES, then ending the present process.

Figure 5:
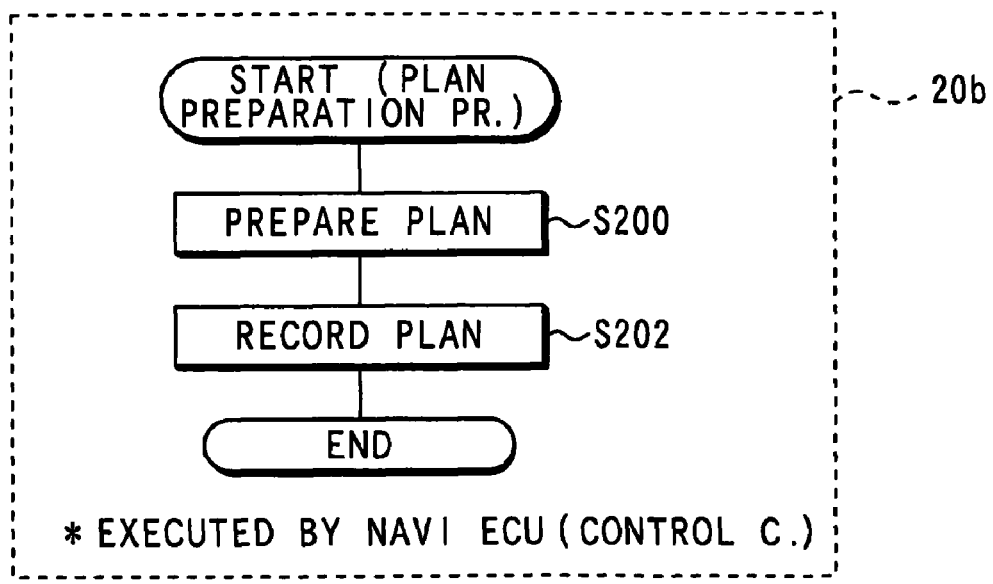
FIG. 5 is a flowchart diagram illustrating a plan preparation process by the navigation ECU.

Next, a plan preparation process 20b by the navigation ECU 20 is explained with reference to FIG. 5. The navigation ECU 20 designates a destination according to a user's operation, and retrieves a guidance route from the present position of the vehicle to the destination. Then, based on a user's operation to a specific switch, the navigation ECU 20 executes the present process illustrated in FIG. 5 while regarding the retrieved guidance route as a planned travel course.

Figure 6:
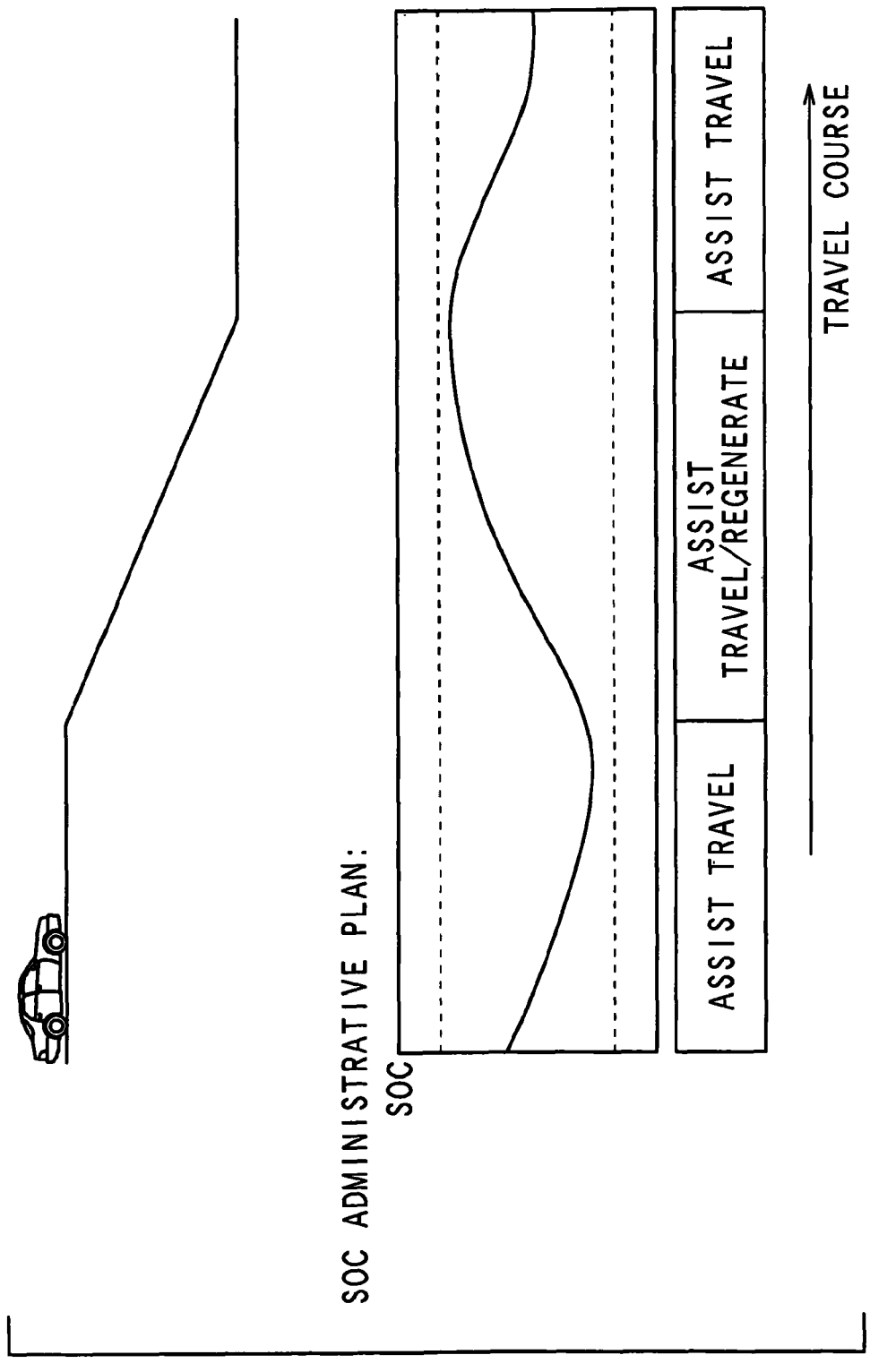
FIG. 6 is a diagram explaining an SOC administrative plan.

First, at S200, a plan is prepared. In detail, the guidance route from the departure point to the destination is first regarded as a planned travel course. The energy required for the vehicle to run or travel the planned travel course is calculated based on the travel information recorded in the durable storage medium. Based on the travel information recorded in the durable storage medium, a travel method is determined with respect to each road identifier. In detail, a reference SOC is acquired from the HV control circuit 10. Based on the acquired reference SOC and the travel information recorded in the durable storage medium along the planned travel course or road sections in an order from the departure point to the destination, with respect to the planned travel course from the departure point to the destination, the control method is determined for every road identifier by calculating the power generation efficiency and assistance efficiency. The control method includes the selection of execution of either an engine travel or an assistance travel, the selection of whether to execute internal combustion charging, and the selection of whether to execute regeneration charging. Thus, based on the travel information recorded in the durable storage medium, an SOC administrative plan (also referred to as a control schedule) relative to the entire road sections of the planned travel course is prepared. The SOC administrative plan, predicts the trend or transition of the planned SOC (control target value) up to the destination. An example of the SOC administrative plan is illustrated in FIG. 6. It is noted that the preparation of such an SOC administrative plan is common knowledge, for instance, which is available in JP-2001-18350 A, or "New Energy Automobile Development" Pages 123 to 124 published by CMC Publication).

Next, at S202, the prepared SOC administrative plan is stored in the durable storage medium, then ending the present process.

Next, an HV control process 20c by the navigation ECU 20 is explained with reference to FIG. 7. When the SOC administrative plan is prepared and stored in the durable storage medium, the navigation ECU 20 starts to execute the present process illustrated in FIG. 7.

First, at S300, the SOC administrative plan is read. In the present embodiment, the SOC administrative plan is read with respect to all the planned travel course (i.e., all the road sections included in the planned travel course).

Next, at S302, the navigation ECU 20 sends out the control information. In detail, based on the present SOC notified by the HV control circuit 10, and the planned SOC in the present position included in the SOC administrative plan, the navigation ECU 20 sends out to the HV control circuit 10 an instruction signal (i.e., control information) to cause the charge amount of the battery 9 in the hybrid vehicle to approach the planned SOC in the present position.

Next, at S304, it is determined whether the difference (i.e., separation or separation gap) between the planned SOC and the present SOC is greater than a predetermined threshold value.

When it is determined that the difference between the planned SOC and the present SOC is greater than the predetermined threshold value, the determination at S304 is affirmed as YES. Then, at S400, a re-plan determination process is executed which determines whether to execute the re-plan of the SOC administrative plan.

Figure 8:
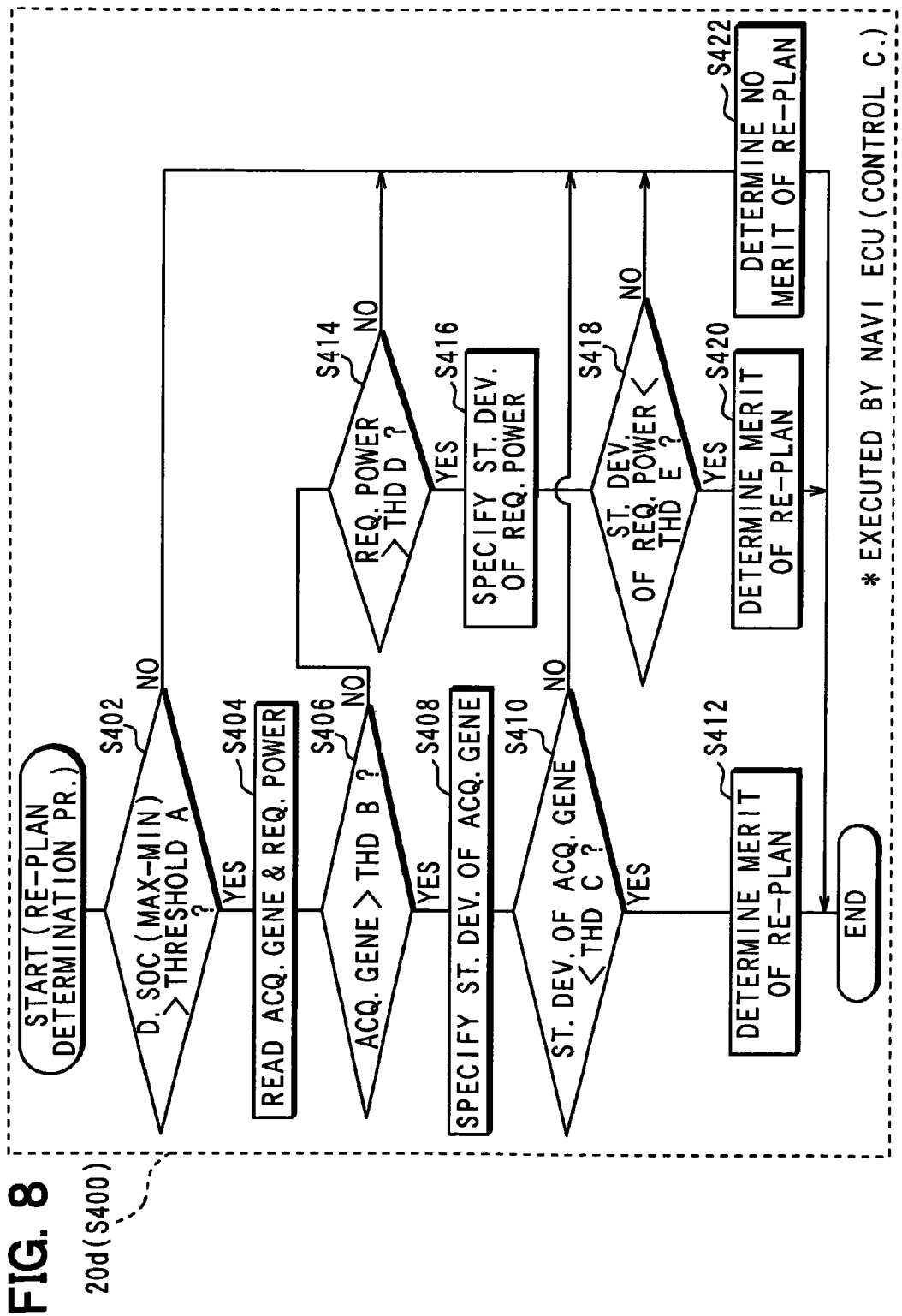
FIG. 8 is a flowchart diagram illustrating a re-plan determination process by the navigation ECU.

FIG. 8 shows a flowchart of the re-plan determination process 20d (i.e., S400). In the present re-plan determination process 20d, first, at S402, it is determined whether the planned travel course includes a road section where the difference between the maximum SOC and minimum SOC is greater than a predetermined threshold value A. In other words, as recognized in FIG. 9, it is similarly determined whether the planned travel course include a difference between the maximum planned SOC and the minimum planned SOC, the difference being greater than the predetermined threshold value A.

When the planned travel course includes the road section where the difference between the maximum SOC and minimum SOC is greater than the predetermined threshold value A, the determination at S402 is affirmed as YES. Next, at S404, it is determined whether the planned travel course includes a road section where the amount of acquisition regeneration is greater than a predetermined threshold value B.

When the planned travel course includes a certain road section where the amount of acquisition regeneration is greater than the predetermined threshold value B, a standard deviation in the amount of acquisition regeneration (i.e., with respect to the certain road section) is specified at S408, based on the accumulated amounts of acquisition regeneration stored in the durable storage medium, as illustrated in FIG. 3. The standard deviation in the amount of acquisition regeneration can be specified based on the average value and accumulated data of the amount of acquisition regeneration (ACQ. REGERATION) illustrated in FIG. 3. Furthermore, the standard deviation σ is computable as follows:

"σ={Σ(measured value−average value)$^2$/$N$}$^{1/2}$."

Next, at S410, it is determined whether the specified standard deviation in the amount of acquisition regeneration is less than a predetermined threshold value C. When the deviation in the accumulated amounts of acquisition regeneration stored in the durable storage medium is small and the standard deviation in the amount of acquisition regeneration is less than the threshold value C, the determination at S410 is affirmed as YES. Thus, at S412, it is determined that there is a merit or advantage in executing a re-plan. The flag for indicating that there is a merit in the re-plan is turned into an ON state. The present process is then ended.

In contrast, when the deviation of the accumulated amounts of acquisition regeneration stored in the durable storage medium is large and the standard deviation in the amount of acquisition regeneration is not less than the threshold value C, the determination at S410 is negated as NO. Thus, at S422, it is determined that there is no merit or advantage in executing a re-plan. The flag for indicating that there is a merit in the re-plan is turned into an OFF state. The present process is then ended.

When the planned travel course includes no road section where the amount of acquisition regeneration is greater than the predetermined threshold value B, the determination at S406 is negated as NO. Next, at S414, it is determined whether the amount of EV travel requirement electrical power is greater than a predetermined threshold value D. That is, when the planned travel course includes a certain road section where the amount of EV travel requirement electrical power is greater than the predetermined threshold value D, a standard deviation in the amount of acquisition regeneration (i.e., with respect to the certain road section) is specified at S416, based on the accumulated amounts of EV travel requirement power stored in the durable storage medium. The standard deviation in the amount of EV travel requirement electrical power can be specified based on the average value and accumulated data of the amount of EV travel requirement electrical power (REQ. EL. POWER) illustrated in FIG. 3.

Next, at S418, it is determined whether the specified standard deviation in the amount of EV travel requirement electrical power is less than a predetermined threshold value E. When the deviation of the accumulated amounts of acquisition regeneration stored in the durable storage medium is small and the standard deviation of the amounts of EV travel requirement electrical power is smaller than the threshold value E, the determination at S418 is affirmed as YES. Thus, at S420, it is determined that there is a merit or advantage in executing a re-plan. The flag for indicating that there is a merit in the re-plan is turned into an ON state. The present process is then ended.

By contrast, when the deviation of the accumulated amounts of EV travel requirement electrical power stored in the durable storage medium is large and the standard deviation of the amounts of EV travel requirement electrical power is equal to or greater than the threshold value E, the determination at S418 is negated as NO. Thus, at S422, it is determined that there is no merit or advantage in executing a re-plan. The flag for indicating that there is a merit in the re-plan is turned into an OFF state. The present process is then ended.

Further, when the planned travel course does not include a road section where the difference between the maximum SOC and minimum SOC is greater than the predetermined threshold value A, the determination at S402 is negated as NO. Thus, at S422, it is determined that there is no merit or advantage in executing a re-plan. The flag for indicating that there is a merit in the re-plan is turned into an OFF state. The present process is then ended.

Figure 7:
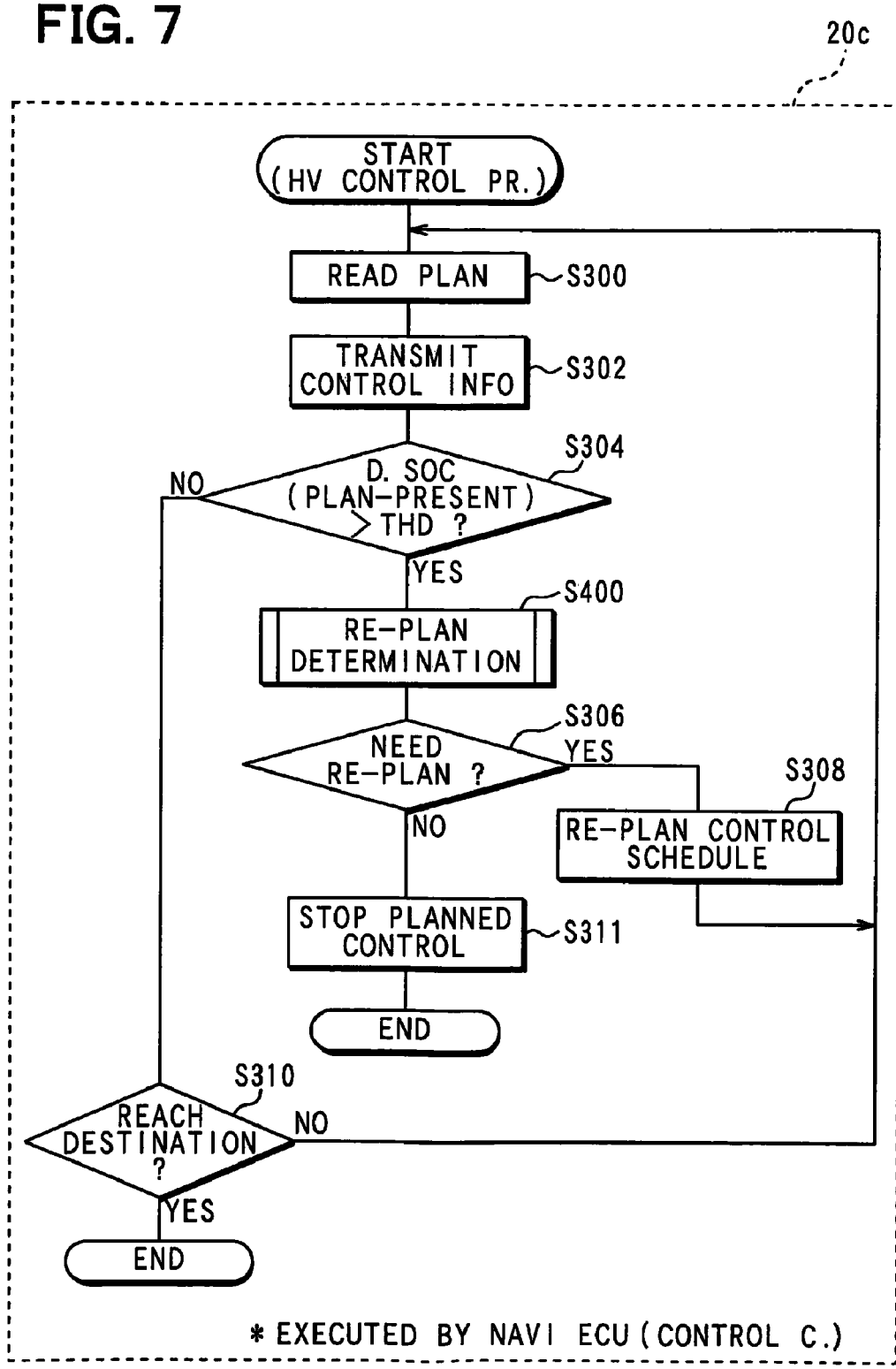
FIG. 7 is a flowchart diagram illustrating an HV control process by the navigation ECU.

Returning to the explanation of FIG. 7, when the re-plan determination process is completed, it is determined next at S306 whether the re-plan is required or not, based on whether the flag which illustrates that there is a merit in the re-plan is in an ON state or OFF state.

When the flag for indicating that there is a merit in the re-plan is turned in an ON state, the determination at S306 is affirmed as YES. At S308, the re-plan of the control schedule is executed. That is, the plan preparation process illustrated in FIG. 5 is performed repeatedly. The processing then returns to S300, where the SOC administrative plan, which is re-planned, is read from the durable storage medium, then advancing the processing yet further.

In contrast, when the flag for indicating that there is a merit in the re-plan is turned in an OFF state, the determination at S306 is negated as NO, interrupting the planned control at S311. In detail, the drive control according to the control schedule is interrupted or stopped to thereby end the present process. That is, the re-plan of the control schedule is prohibited. Furthermore, after stopping the drive control according to the control schedule, a drive control according to a predetermined rule is executed.

Further, when it is determined that the difference between the planned SOC and the present SOC is greater than the predetermined threshold value, the determination at S304 is negated as NO. Next, at S308, it is determined whether the vehicle arrives at the destination based on whether the vehicle is located within a predetermined range from the destination. When the vehicle does not arrive at the destination, the determination at S310 is negated as NO, returning the processing to S300.

Further, when the vehicle arrives at the destination, the determination at S310 is affirmed as YES, then ending the present process.

Figure 9:
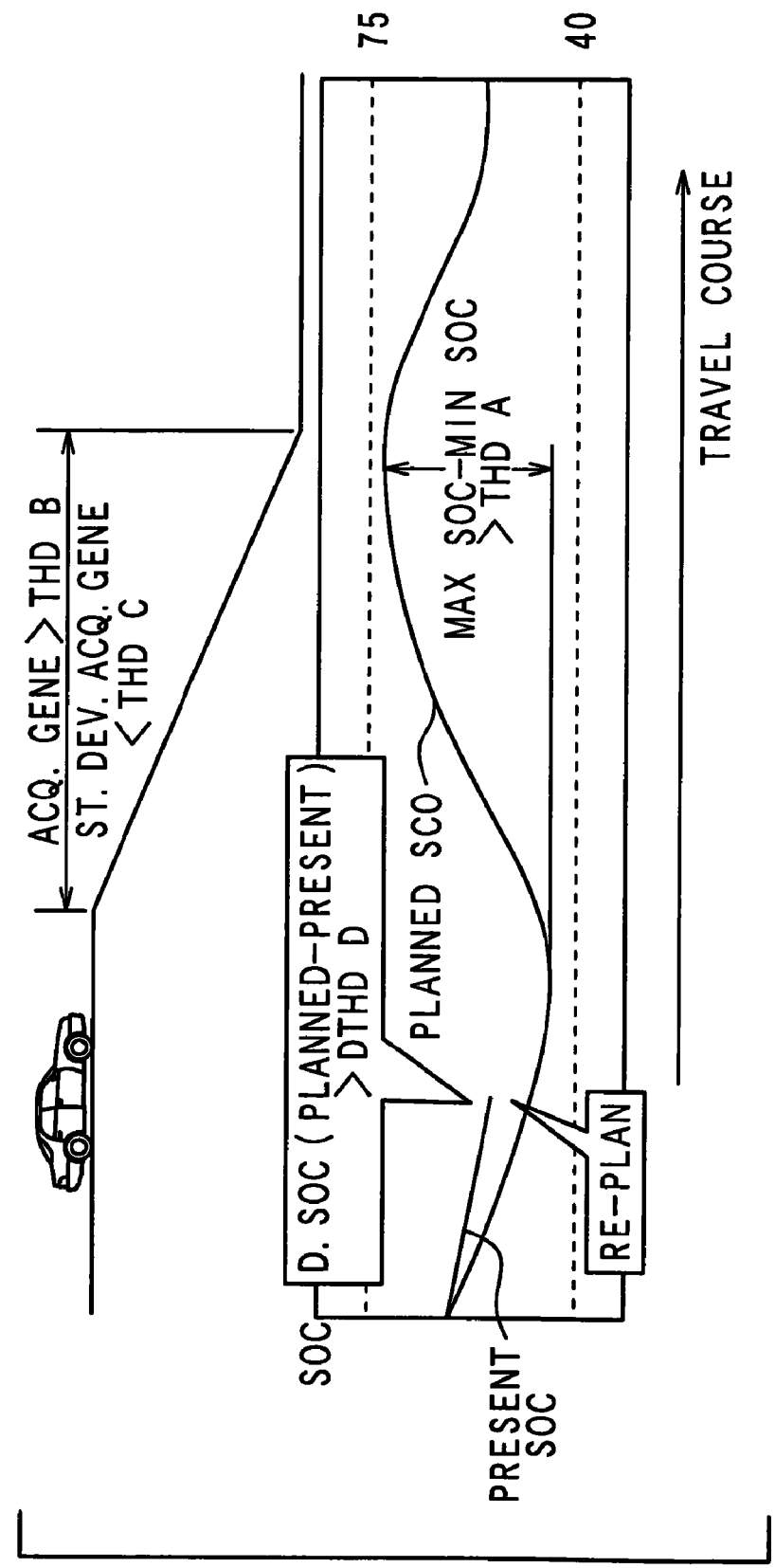
FIG. 9 is a diagram illustrating a states where a re-plan is determined to be made.

Thus, the re-plan is executed in the above mentioned process, for instance, in cases as illustrated in FIG. 9, namely, when all the following conditions (i) to (iv) are satisfied at the same time: (i) the difference (i.e., a separation width) between the planned SOC and the present SOC is greater than the predetermined (difference-related) threshold value; (ii) the planned travel course includes a road section where the difference between the maximum SOC and minimum SOC is greater than the predetermined (difference-related) threshold value A; (iii) the amount of acquisition regeneration is greater than the predetermined (acquisition-related) threshold value B; and (iv) the standard deviation in the amount of acquisition regeneration is less than the predetermined (deviation-related) threshold value C. In other words, (i) the difference between the planned SOC and the present SOC is large; (ii) the planned travel course includes a road section where the difference between the maximum SOC and minimum SOC is large; (iii) the planned travel route includes a road section having a large amount of acquisition regeneration; and (iv)

the deviation among the collected amounts of acquisition regeneration is small. When such conditions are fulfilled simultaneously, it is supposed that the re-plan can be executed so as to aim at the improvement in the gas mileage or fuel efficiency by using the physiographic merit of the travel course. Thus, the re-plan is executed.

Further, the re-plan can be also executed when the following conditions are satisfied at the same time: (i) the difference between the planned SOC and the present SOC is greater than the predetermined (difference-related) threshold value; (ii) the planned travel course includes a road section where the difference between the maximum SOC and minimum SOC is greater than the predetermined (difference-related) threshold value A; (iii) the amount of EV travel requirement electrical power is greater than the predetermined (requirement-related) threshold value D; and (iv) the standard deviation in the amount of EV travel requirement electrical power is less than the predetermined (deviation-related) threshold value E. That is, (i) the difference between the planned SOC and the present SOC is large; (ii) the planned travel course includes a road section where the difference between the maximum SOC and minimum SOC is large; (iii) the travel course includes a road section having a large amount of EV travel requirement electrical power; and (iv) the deviation among the collected amounts of EV travel requirement electrical power is small. When such conditions are fulfilled simultaneously, it is supposed that the great merit can be obtained in the enhancement of the fuel mileage by the re-plan. Thus, the re-plan is executed.

In this regard, however, even when the following two conditions are satisfied: (i) the difference between the planned SOC and the present SOC is large and (ii) the planned travel course includes a road section where the difference between the maximum SOC and minimum SOC is greater than the predetermined threshold value A, there may be a case that (i) the amount of acquisition regeneration is not greater than the threshold value B; and (ii) the amount of EV travel requirement electrical power is not less than the threshold value D. In such case, the re-plan is not executed. That is, the re-plan is prohibited. Further, even when the amount of acquisition regeneration is greater than the threshold value B, there may be a case that the standard deviation of the amounts of acquisition regeneration is not less than the threshold value C. In such a case, the re-plan is not executed; namely, the re-plan is prohibited. Otherwise, even when the amount of EV travel requirement electrical power is greater than the threshold value D, the standard deviation of the amounts of EV travel requirement electrical power is not less than the threshold value E. In such a case, the re-plan is not executed; namely, the re-plan is prohibited.

According to the above-mentioned configuration of the present embodiment, when it is determined that (i) the planned travel course includes a certain road section having an acquisition electrical power amount greater than the threshold value B, and (ii) the standard deviation of the acquisition electrical power amounts collected with respect to the certain road section of the travel course is less than the threshold value C, the re-plan of the control schedule is executed. Further, even when it is determined that (i) the planned travel course includes a certain road section having an acquisition electrical power amount greater than the threshold value B, there may be a case when it is determined that the standard deviation of the acquisition electrical power amounts collected with respect to the certain road section of the travel course is not less than the threshold value C. In such a case, the re-plan of the control schedule is prohibited. Such a configuration can improve a fuel consumption in the hybrid vehicle that executes a drive control of an internal combustion engine and a motor based on a planned operation schedule.

Further, when the deviation of the collected acquisition electrical power amounts is large, the determination as to whether to make a reexamination (re-plan) of the drive control according to the control schedule may be made based on uncertain information. In contrast, in the present embodiment, the determination as to whether to make a reexamination of the drive control according to the control schedule can be made not only based on whether the planned travel course includes a certain road section where an acquisition electrical power amount is greater than a first (acquisition-related) threshold value but also based on whether the standard deviation of the acquisition electrical power amounts collected with respect to the certain road section of the travel course is less than the (deviation-related) threshold value C. Thus, the determination as to whether to make a reexamination of the drive control according to the schedule can be made based on more accurate information.

Further, when it is determined that (i) the planned travel course includes a road section having an acquisition electrical power amount greater than the threshold value B, and (iv) the corresponding standard deviation of the amounts of EV travel requirement electrical power is less than the threshold value E, the re-plan of the control schedule is executed. Further, even when it is determined that (i) the planned travel course includes a road section where the EV travel requirement electrical power amount is greater than the threshold value D, there may be a case when the corresponding standard deviation of the amounts of EV travel requirement electrical power is not less than the threshold value E. In such a case, the re-plan of the control schedule is prohibited. Thus, enhancement in the gas mileage or fuel efficiency can be made.

Further, when the deviation among the collected amounts of EV travel requirement electrical power is large, the determination as to whether to make a reexamination of the drive control according to the control schedule may be made based on uncertain information. In contrast, in the present embodiment, not only based on whether the planned travel course includes a road section where the EV travel requirement electrical power amount is greater than the threshold value D but also based on whether the corresponding standard deviation of the EV travel requirement electrical power amounts collected with respect to a portion of the travel course is less than the threshold value E, the determination as to whether to make a reexamination of the drive control according to the control schedule is made. Thus, the determination as to whether to make a reexamination of the drive control according to the control schedule can be made based on more accurate information.

It is noted that when the variation of the control index in a road section of the planned travel course is small, the reexamination of the drive control according to the control schedule cannot provide an improvement in the gas mileage or fuel efficiency in many cases. In contrast, when the variation of the control index in a road section of the planned travel course is large, the reexamination of the drive control according to the control schedule can provide an improvement in the gas mileage or fuel efficiency in many cases. In the present embodiment, when the difference between the maximum value and the minimum value of the control index in the planned travel course is greater than the threshold value A, it is determined whether the planned travel course includes a road section having an acquisition electrical power amount greater than the threshold value B. Such a configuration can provide an improvement in the gas mileage or fuel efficiency.

In the present embodiment, the re-plan determination process is executed using the amount of acquisition regeneration and the amount of EV travel requirement electrical power from among the travel information items collected in association with the travel of the vehicle. Without need to be limited thereto, the re-plan determination process can be made so as to include as a determination condition another travel information item such as a gradient, vehicle speed, number of temporary stop lines, etc. For example, whether or not the travel course includes a road section where the gradient or slope is not less than 5% and the amount of acquisition regeneration is greater than the threshold value B can be a determination condition.

Second Embodiment

The configuration of the drive control apparatus of the hybrid vehicle concerning a second embodiment of the present invention is the same as that of the first embodiment in FIG. 1. The above first embodiment provides the configuration where whether to make a re-plan of the control schedule is determined based on the amount of acquisition regeneration in a road section of the travel course, the amount of EV travel requirement electrical power, etc. in the re-plan determination process. The present second embodiment provides a configuration where whether to make a re-plan of the control schedule is determined based on whether a difference between a speed measured in association with the present travel of the vehicle and the speed in the past in the same road section recorded in the durable storage medium is greater than a predetermined threshold value.

Figure 10:
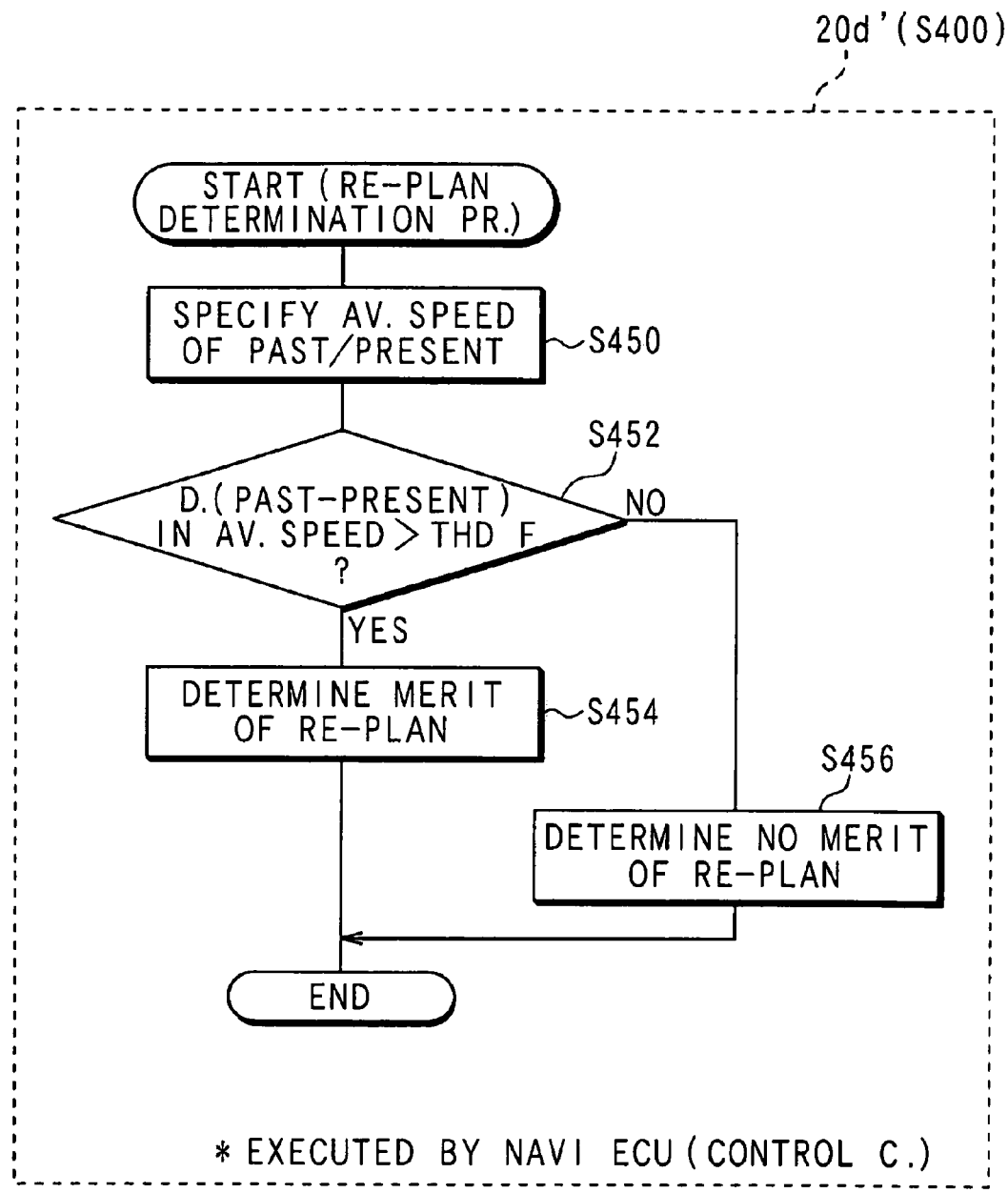
FIG. 10 is a flowchart diagram illustrating a re-plan determination process by the navigation ECU according to a second embodiment of the present invention.

The flowchart of the re-plan determination process $20d'$ of the drive control apparatus of the hybrid vehicle concerning the present second embodiment is illustrated in FIG. 10. The navigation ECU 20 executes the re-plan determination process illustrated in FIG. 10 when it is determined that the difference or separation width between the planned SOC and the present SOC is greater than the predetermined threshold value at S304 in FIG. 7.

First, at S450, the navigation ECU 20 specifies the past average speed and the present average speed. For instance, while reading the average speed measured up to the previous road section in association, with the present travel of the vehicle from the durable storage medium, the speeds in the past in the same road section recorded in the durable storage medium are also read.

Next, at S452, it is determined whether the difference between the past average speed and the present average speed is greater than a predetermined (speed-related) threshold value F.

When it is determined that the difference between the past average speed and the present average speed is greater than the predetermined threshold value F, the determination at S452 is affirmed as YES. Thus, at S454, it is determined that there is a merit or advantage in executing a re-plan. The flag for indicating that there is a merit in the re-plan is turned into an ON state; then, the processing returns to FIG. 7.

In contrast, when it is determined that the difference between the past average speed and the present average speed is not greater than the predetermined threshold value F, the determination at S452 is negated as NO. Thus, at S456, it is determined that there is no merit or advantage in executing a re-plan. The flag for indicating that there is a merit in the re-plan is turned into an OFF state; then, the processing returns to FIG. 7.

Therefore, when the difference between the past average speed and the present average speed is greater than the predetermined threshold value F, the re-plan of the control schedule is executed. In contrast, when the difference between the past average speed and the present average speed is not greater than the predetermined threshold value F, the re-plan of the control schedule is prohibited.

According to the above-mentioned configuration of the present second embodiment, when it is determined that the difference between the speed measured and the past speed recorded in the storage device with respect to the same road section is greater than the predetermined threshold value, a reconsideration (i.e., a re-plan) of the drive control according to the control schedule is made. When it is determined that the difference between the speed measured and the past speed recorded in the storage device with respect to the identical road section is not greater than the predetermined threshold value, a reconsideration of the drive control according to the control schedule is prohibited. Such a configuration can improve a fuel consumption in the hybrid vehicle that executes a drive control of the internal combustion engine and the motor based on the planned operation schedule.

Third Embodiment

Figure 11:
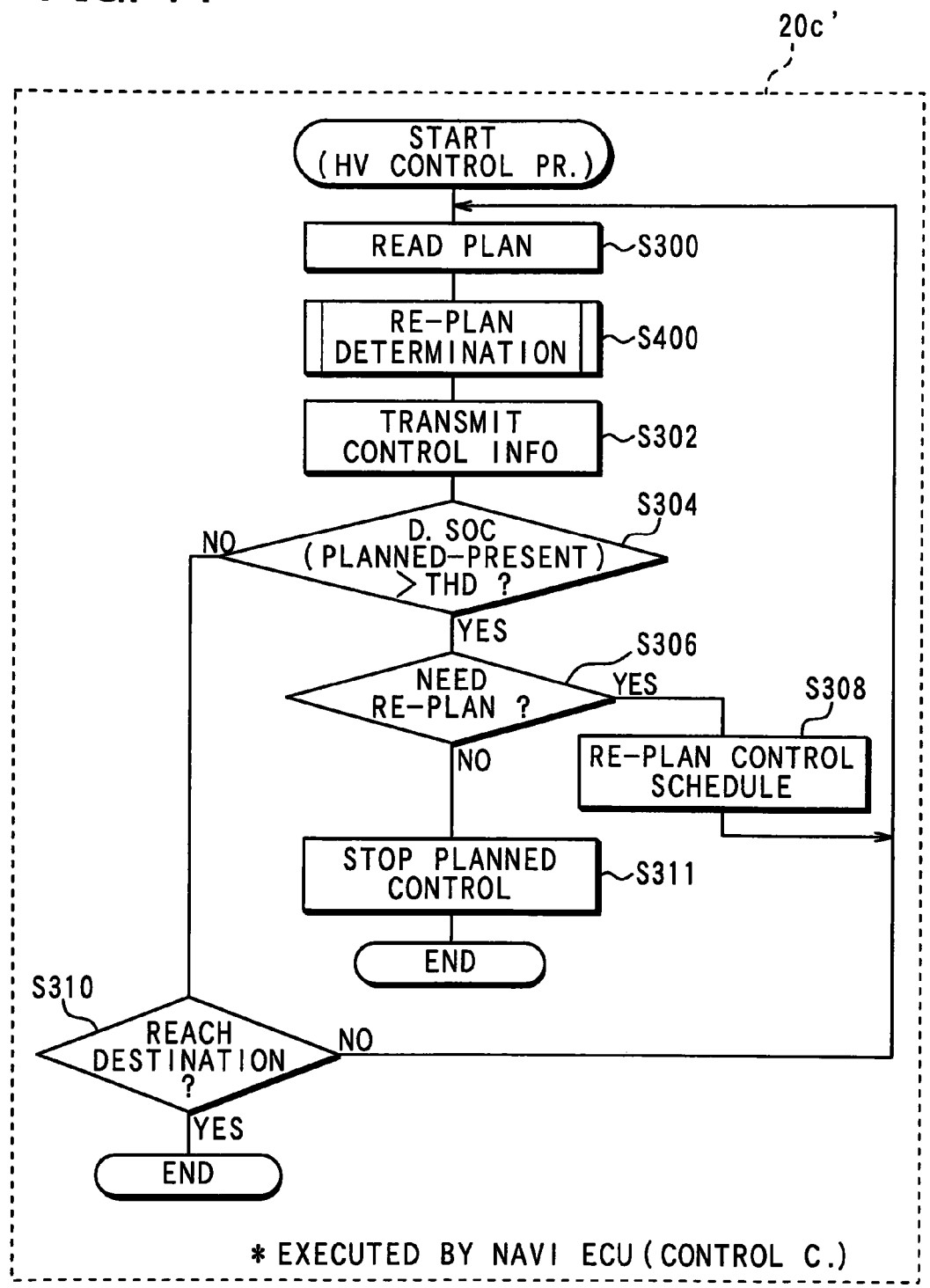
FIG. 11 is a flowchart diagram illustrating a modification of an HV control process by the navigation ECU.

The above first and the second embodiments provide a configuration, as illustrated in FIG. 7, where when it is determined that the separation width or difference between the planned SOC and present SOC is greater than the threshold value at S304 after sending out the control information at S302, the re-plan determination process is executed. However, without need to be limited thereto, prior to determining whether the difference between the planned SOC and the present SOC is larger than the threshold value, for example, as illustrated in FIG. 11, prior to sending out the control information at S302, the re-plan determination process may be executed.

Other Embodiments

In the above first and second embodiments, as illustrated in FIG. 8, the determination as to whether to make the re-plan of the planned control schedule based on the following the results of the four determinations (1) to (4): (1) Determination as to whether the amount of acquisition regeneration is greater than the threshold value B (S406); (2) Determination as to whether the standard deviation in the amount of acquisition regeneration is less than the threshold value C (S410); (3) Determination as to whether the amount of EV travel requirement electrical power is greater than the threshold value D (S414); and (4) Determination as to whether the standard deviation of the amount of EV travel requirement electrical power is less than the threshold value E (S418). For instance, while omitting the determinations (2), (3), and (4), whether to make the re-plan may be determined based on the result of the determination (1). Further, while omitting the determinations (1), (3), and (4), whether to make the re-plan may be determined based on the result of the determination (2). Furthermore, while omitting the determinations (3), and (4), whether to make the re-plan may be determined based on the result of the determinations (1), and (2). Yet furthermore, while omitting the determinations (1), and (2), whether to make the re-plan may be determined based on the result of the determinations (3), and (4).

Further, in the above first to third embodiments, by making the re-plan of the planned control schedule, the re-consideration of the drive control according to the control schedule is made. Without need to be limited thereto, for instance, without making the re-plan of the control schedule, the control information outputted to the HV control circuit 10 may be amended so as to meet the planned control schedule. Thus, the reconsideration or re-examination of the drive control according to the control schedule can be made.

In addition, in the above embodiments, the control schedule is specified using the planned SOC. In contrast, the control schedule can be specified by using control indices other than the planned SOC.

Further, in the above embodiments, after retrieving a guidance route from the present position of the vehicle to the destination, the re-plan of the control schedule is made while regarding the retrieved guidance route as the planned travel course. Without need to be limited thereto, the re-plan of the control schedule may not need to be made while regarding the guidance route as a planned travel course. For example, the travel route to reach a destination may be inferred based on the past driving history; then, planning of the control schedule can be made while regarding the inferred travel route to reach the destination as the planned travel course.

Further, in the above embodiments, respective standard deviations relative to the amount of acquisition regeneration and the amount of EV travel requirement electrical power are used for indicating an index of the deviation relative to the amount of acquisition regeneration and the amount of EV travel requirement electrical power. For example, the index other than the standard deviation, such as distribution and the difference from the average value, may be adopted.

Furthermore, in the above embodiments, S100 to S108 executed by the navigation ECU 20 (i.e., the travel information record process 20a) may function collectively as a travel information record means or section. S406 executed by the navigation ECU 20 may function as an acquisition power determination means or section. S306 and S308 may function as a drive management means or section. The durable storage medium functions as a storage means or device. S414 by the navigation ECU 20 may function as a requirement power determination means or section. S402 by the navigation ECU 20 may function as a difference determination means or section. S410 by the navigation ECU 20 may function as a deviation determination means or section with respect to an acquisition electrical power. S418 by the navigation ECU 20 may function as a deviation determination means or section with respect to a requirement electrical power. The speed sensor 13 may function as a speed measurement means or section. S452 by the navigation ECU 20 may function as a speed determination means or section. The HV control circuit 10 may function as a drive control device. Further, each of sections or each of steps included in the flowcharts of the processes explained in the above embodiments can be divided into several sections steps, or be merged with other section(s) or step(s) to form a new section or step, without need to be limited to the above mentioned sections or steps.

Each or any combination of processes, sections, steps, or means explained in the above can be achieved as a software section or unit (e.g., subroutine) and/or a hardware section or unit (e.g., circuit or integrated circuit), including or not including a function of a related device; furthermore, the hardware section or unit can be constructed inside of a microcomputer.

Furthermore, the software section or unit or any combinations of multiple software sections or units can be included in a software program, which can be contained in a computer-readable storage media or can be downloaded and installed in a computer via a communications network.

Aspects of the disclosure described herein are set out in the following clauses.

As an aspect of the disclosure, a drive control apparatus for a hybrid vehicle, which travels using an internal combustion engine and a motor as power sources for a travel, is provided as follows. The apparatus executes a drive control of the internal combustion engine and the motor according to a planned control schedule. In the apparatus, a travel information record section is configured (i) to collect in association with a travel of the vehicle an amount of acquisition electrical power, which is acquired when regeneratively charging a battery to drive the motor, every predetermined road section and (ii) to record in a storage device the collected amount of acquisition electrical power every the predetermined road section. An acquisition power determination section is configured (i) to acquire from the storage device an amount of acquisition electrical power relative to each of road sections included in a planned travel course, which is specified by the planned control schedule, and (ii) to make an acquisition determination as to whether the planned travel course includes a road section where an amount of acquisition electrical power is greater than an acquisition-related threshold value. A drive management section is configured (i) to make a reconsideration of the drive control, which is to be executed according to the planned control schedule, when it is determined that the planned travel course includes the road section where the amount of acquisition electrical power is greater than the acquisition-related threshold value, and (ii) to prohibit the reconsideration of the drive control, which is to be executed according to the planned control schedule, when it is determined that the planned travel course includes no road section where the amount of acquisition electrical power is greater than the acquisition-related threshold value.

Under such a configuration, when it is determined that the planned travel course includes the road section or travel section where the amount of acquisition electrical power is greater than the acquisition-related threshold value, a reconsideration of the drive control according to the control schedule is made. In contrast, when it is determined that the planned travel course includes no road section or travel section where the amount of acquisition electrical power is greater than the acquisition-related threshold value, the reconsideration of the drive control according to the control schedule is prohibited. Such a configuration can improve a fuel consumption in the hybrid vehicle that executes a drive control of the internal combustion engine and the motor based on the planned operation schedule.

As an optional aspect of the above apparatus, the travel information record section may be further configured (i) to collect, in association with the travel, an amount of requirement electrical power, which is required for the motor being used as the power source, every predetermined road section and (ii) to record the collected amount of requirement electrical power in the storage device. The apparatus may further comprise: a requirement power determination section configured (i) to acquire from the storage device the amount of requirement electrical power relative to the each of the road sections included in the planned travel course, and (ii) to make a requirement power determination as to whether the planned travel course includes a road section where an amount of requirement electrical power is greater than a requirement-related threshold value. The drive management section may be further configured to make the reconsideration of the drive control, which is to be executed according to the planned control schedule, when the acquisition power determination section determines that the planned travel course includes a road section where an amount of acquisition electrical power is greater than the acquisition-related threshold value, or when the requirement power determination section determines that the planned travel course includes a road section where an amount of requirement electrical power is greater than the requirement-related threshold value. The drive management section may be further configured to prohibit the reconsideration of the drive control, which is to be executed according to the planned control schedule, when, while the acquisition power determination section determines that the planned travel course includes no road section where an amount of acquisition electrical power is greater than the acquisition-related threshold value, the requirement power determination section determines that the planned travel course includes no road section where an amount of requirement electrical power is greater than the requirement-related threshold value.

It is noted that when a deviation of the collected acquisition electrical power amounts is large, the determination as to whether to make a reexamination or reconsideration of the drive control according to the control schedule may be made based on uncertain information.

To that end, as an optional aspect, the above drive control apparatus may further comprise: a deviation determination section configured to make a deviation determination as to whether with respect to a road section in the planned travel course a deviation in the amounts of acquisition electrical power recorded in the storage device is less than a deviation-related threshold value. The drive management section may be further configured (i) to make the reconsideration of the drive control, which is to be executed according to the planned control schedule, when, while the acquisition power determination section determines that the planned travel course includes a road section where an amount of acquisition electrical power is greater than the acquisition-related threshold value, the deviation determination section determines that, with respect to the road section having the amount of acquisition electrical power being greater than the acquisition-related threshold value, a deviation in amounts of acquisition electrical power recorded in the storage device is less than the deviation-related threshold value, and (ii) to prohibit the reconsideration of the drive control, which is to be executed according to the planned control schedule, when, although the acquisition power determination section determines that the planned travel course includes a road section where an amount of acquisition electrical power is greater than the acquisition-related threshold value, the deviation determination section determines that, with respect to the road section having the amount of acquisition electrical power being greater than the acquisition-related threshold value, a deviation in amounts of acquisition electrical power recorded in the storage device is not less than the deviation-related threshold value.

Thus, the determination as to whether to make a reexamination or reconsideration of the drive control according to the control schedule can be made based on more accurate information.

Further, it is noted that when a variation or difference of the control index in a road section of the travel course is small, the reexamination of the drive control according to the control schedule may not provide an improvement in the gas mileage or fuel efficiency in many cases. In contrast, when the variation or difference of the control index in a road section of the travel course is large, the reexamination of the drive control according to the control schedule may provide an improvement in the gas mileage or fuel efficiency in many cases.

To that end, as an optional aspect of the above drive control apparatus, the control schedule may be specified using a control index indicating a residual amount of the battery. The apparatus may be further comprise: a difference determination section configured to make a difference determination as to whether a difference between a maximum value and a minimum value in the control index with respect to the planned travel course is greater than a difference-related threshold value. The acquisition power determination section may be further configured to make the acquisition determination as to whether the planned travel course includes a road section where an amount of acquisition electrical power is greater than the acquisition-related threshold value when the difference determination section determines that the difference between the maximum value and the minimum value is greater than the difference-related threshold value.

As an aspect of the disclosure, a drive control apparatus for a hybrid vehicle, which travels using an internal combustion engine and a motor as power sources for a travel, is provided as follows. The apparatus executes a drive control of the internal combustion engine and the motor according to a planned control schedule. In the apparatus, a travel information record section is configured (i) to collect in association with a travel of the vehicle an amount of requirement electrical power, which is required when the battery is used as the power source, every predetermined road section and (ii) to record in a storage device the collected amount of requirement electrical power every the predetermined road section. A requirement power determination section is configured (i) to acquire from the storage device an amount of requirement electrical power relative to each of road sections included in a planned travel course, which is specified by the planned control schedule, and (ii) to make a requirement determination as to whether the planned travel course includes a road section where an amount of requirement electrical power is greater than a requirement-related threshold value. A drive management section is configured (i) to make a reconsideration of the drive control, which is to be executed according to the planned control schedule, when it is determined that the planned travel course includes the road section where the amount of requirement electrical power is greater than the requirement-related threshold value, and (ii) to prohibit the reconsideration of the drive control, which is to be executed according to the planned control schedule, when it is determined that the planned travel course includes no road section where the amount of requirement electrical power is greater than the requirement-related threshold value.

Under such a configuration, when it is determined that the planned travel course includes the travel section where the amount of requirement electrical power is greater than the requirement-related threshold value, a reconsideration of the drive control according to the control schedule. In contrast, when it is determined that the planned travel course includes no travel section where the amount of requirement electrical power is greater than the requirement-related threshold value, the reconsideration of the drive control according to the control schedule is prohibited. Such a configuration can improve a fuel consumption in the hybrid vehicle that executes a drive control of the internal combustion engine and the motor based on the planned operation schedule.

When the deviation of the collected acquisition electrical power amounts is large, the determination as to whether to make a reexamination of the drive control according to the control schedule may be made based on uncertain information.

As an optional aspect, the drive control apparatus may further comprise: a deviation determination section configured to make a deviation determination as to whether with respect to a road section in the planned travel course a deviation in the amounts of requirement electrical power recorded in the storage device is less than a deviation-related threshold value. The drive management section may be further configured, (i) to make the reconsideration of the drive control, which is to be executed according to the planned control schedule, when, while the requirement power determination section determines that the planned travel course includes a road section where an amount of requirement electrical power is greater than the requirement-related threshold value, the deviation determination section determines that with respect to the road section having the amount of requirement electrical power being greater than the requirement-related threshold value, a deviation in amounts of requirement electrical power recorded in the storage device is less than the deviation-related threshold value, and (ii) to prohibit the reconsideration of the drive control, which is to be executed according to the control schedule, when, although the requirement power determination section determines that the planned travel course includes a road section where an amount of requirement electrical power is greater than the requirement-related threshold value, the deviation determination section determines that, with respect to the road section having the amount of requirement electrical power being greater than the requirement-related threshold value, a deviation in amounts of requirement electrical power recorded in the storage device is not less than the deviation-related threshold value.

Thus, the determination as to whether to make a reexamination of the drive control according to the control schedule can be made based on more accurate information.

As an optional aspect of the above drive control apparatus, the control schedule may be specified using a control index indicating a residual amount of the battery. The apparatus may further comprise: a difference determination section configured to make a difference determination as to whether a difference between a maximum value and a minimum value in the control index with respect to the planned travel course is greater than a difference-related threshold value. The requirement power determination section may be further configured to make the requirement determination as to whether the planned travel course includes a road section where an amount of requirement electrical power is greater than the requirement-related threshold value when the difference determination section determines that the difference between the maximum value and the minimum value is greater than the difference-related threshold value.

Further, as another aspect of the disclosure, a drive control apparatus for a hybrid vehicle, which travels using an internal combustion engine and a motor as power sources for a travel, is provided as follows. The apparatus executes a drive control of the internal combustion engine and the motor according to a planned control schedule in association with a travel course. In the apparatus, a speed detector is configured to detect a speed of the vehicle. A travel information record section is configured to collect a speed of the vehicle every predetermined road section in association with a travel of the vehicle and record the collected speeds in a storage device. A speed determination section is configured to make a speed determination during traveling the travel course as to whether a difference between (i) a speed presently detected in a road section by the speed detector and (ii) a past speed, which is recorded in the storage device with respect to the identical road section, is greater than a predetermined speed-related threshold value. A drive management section is configured (i) to make a reconsideration of the drive control, which is to be executed according to the planned control schedule, when the speed determination section determines that the difference between the speed presently detected by the speed detector and the past speed recorded in the storage device with respect to the identical road section is greeter than the speed-related threshold value, and (ii) to prohibit a reconsideration of the drive control, which is to be executed according to the planned control schedule, when the speed determination section determines that the difference between the speed detected presently by the speed detector and the past speed recorded in the storage device with respect to the identical road section is not greater than the speed-related threshold value.

Under such a configuration, when it is determined that the difference between the speed measured and the past speed recorded in the storage device with respect to the same road section is greater than the predetermined threshold value, a reconsideration of the drive control according to the control schedule is made. In contrast, when it is determined that the difference between the speed measured and the past speed recorded in the storage device with respect to the identical road section is not greater than the predetermined threshold value, a reconsideration of the drive control according to the control schedule is prohibited. Such a configuration can improve a fuel consumption in the hybrid vehicle that executes a drive control of the internal combustion engine and the motor based on the planned operation schedule.

As an optional aspect of the drive control apparatus, the drive management section may be further configured to make the reconsideration of the drive control, which is to be executed according to the planned control schedule, by executing a re-plan of the planned control schedule.

As an optional aspect, the drive control apparatus may further comprise: a drive control device configured to execute a drive control of the internal combustion engine and the motor. The drive management section may be further configured to make the reconsideration of the drive control, which is to be executed according to the planned control schedule, by amending control information outputted to the drive control device so as to meet the planned control schedule.

As an optional aspect, the drive control apparatus may further comprise: a route retrieval section configured to retrieve a route to a previously designated destination. Herein, the planned travel course may be the route retrieved by the route retrieval section; and the drive control may be executed according to the control schedule planned along the route retrieved by the route retrieval section.

As an optional aspect of the drive control apparatus, the control schedule may be specified using a control index indicating a residual amount of the battery; and the control index may be defined as a planned control index with respect to each of the road sections included in the planned travel course. The apparatus may further comprise: a separation determination section configured to make a separation determination as to whether, with respect to each of the road sections included in the travel course, a separation gap between a planned control index and a present control index presently taking place is greater than a separation-related threshold value. Herein, the drive management section may be further configured, only when the separation determination section determines that the separation gap between the planned control index and the present control index is greater than the separation-related threshold value, (i) to make the reconsideration of the drive control, which is to be executed according to the planned control schedule, or (ii) to prohibit the reconsideration of the drive control, which is to be executed according to the planned control schedule.

It will be obvious to those skilled in the art that various changes may be made in the above-described embodiments of the present invention. However, the scope of the present invention should be determined by the following claims.

What is claimed:

1. A drive control apparatus for a hybrid vehicle that travels using an internal combustion engine and a motor as power sources for travel, the apparatus executing drive control of the internal combustion engine and the motor according to a planned control schedule, the apparatus comprising:
- a travel information record section configured
  - (i) to collect in association with travel of the vehicle an amount of acquisition electrical power, which is acquired when regeneratively charging a battery to drive the motor, for a plurality of predetermined road sections and
  - (ii) to record in a storage device the collected amount of acquisition electrical power for each of the plurality of predetermined road sections;
- an acquisition power determination section configured
  - (i) to acquire from the storage device an amount of acquisition electrical power relative to each of the plurality of predetermined road sections included in a planned travel course, which is specified by the planned control schedule, and
  - (ii) to make an acquisition determination as to whether the planned travel course includes a road section where an amount of acquisition electrical power is greater than an acquisition-related threshold value; and
- a drive management section configured
  - (i) to make a reconsideration of the drive control, which is to be executed according to the planned control schedule, when it is determined that the planned travel course includes the road section where the amount of acquisition electrical power is greater than the acquisition-related threshold value, and
  - (ii) to prohibit the reconsideration of the drive control, which is to be executed according to the planned control schedule, when it is determined that the planned travel course includes no road section where the amount of acquisition electrical power is greater than the acquisition-related threshold value.

2. The drive control apparatus according to claim 1, wherein
the travel information record section is further configured
  - (i) to collect, in association with the travel, an amount of requirement electrical power, which is required for the motor being used as the power source, for each of the plurality of predetermined road sections and
  - (ii) to record the collected amount of requirement electrical power in the storage device,
the apparatus further comprising:
a requirement power determination section configured
  - (i) to acquire from the storage device the amount of requirement electrical power relative to the each of the plurality of predetermined road sections included in the planned travel course, and
  - (ii) to make a requirement power determination as to whether the planned travel course includes a road section where an amount of requirement electrical power is greater than a requirement-related threshold value,
the drive management section being further configured
  - (i) to make the reconsideration of the drive control, which is to be executed according to the planned control schedule,
    when the acquisition power determination section determines that the planned travel course includes a road section where an amount of acquisition electrical power is greater than the acquisition-related threshold value, or
    when the requirement power determination section determines that the planned travel course includes a road section where an amount of requirement electrical power is greater than the requirement-related threshold value, and
  - (ii) to prohibit the reconsideration of the drive control, which is to be executed according to the planned control schedule,
    when, while the acquisition power determination section determines that the planned travel course includes no road section where an amount of acquisition electrical power is greater than the acquisition-related threshold value, the requirement power determination section determines that the planned travel course includes no road section where an amount of requirement electrical power is greater than the requirement-related threshold value.

3. The drive control apparatus according to claim 1, further comprising:
a deviation determination section configured to make a deviation determination as to whether with respect to a road section in the planned travel course a deviation in the amounts of acquisition electrical power recorded in the storage device is less than a deviation-related threshold value,
the drive management section being further configured
  - (i) to make the reconsideration of the drive control, which is to be executed according to the planned control schedule,
    when, while the acquisition power determination section determines that the planned travel course includes a road section where an amount of acquisition electrical power is greater than the acquisition-related threshold value, the deviation determination section determines that, with respect to the road section having the amount of acquisition electrical power being greater than the acquisition-related threshold value, a deviation in amounts of acquisition electrical power recorded in the storage device is less than the deviation-related threshold value, and
  - (ii) to prohibit the reconsideration of the drive control, which is to be executed according to the planned control schedule,
    when, although the acquisition power determination section determines that the planned travel course includes a road section where an amount of acquisition electrical power is greater than the acquisition-related threshold value, the deviation determination section determines that, with respect to the road section having the amount of acquisition electrical power being greater than the acquisition-related threshold value, a deviation in amounts of acquisition electrical power recorded in the storage device is not less than the deviation-related threshold value.

4. The drive control apparatus according to claim 1,
wherein the control schedule is specified using a control index indicating a residual amount of the battery,
the apparatus further comprising:
a difference determination section configured to make a difference determination as to whether a difference between a maximum value and a minimum value in the control, index with respect to the planned travel course is greater than a difference-related threshold value, the acquisition power determination section being further configured to make the acquisition determination as to whether the planned travel course includes a road section where an amount of acquisition electrical power is greater than the acquisition-related threshold value when the difference determination section determines that the difference between the maximum value and the minimum value is greater than the difference-related threshold value.

5. A drive control apparatus for a hybrid vehicle that travels using an internal combustion engine and a motor as power sources for travel, the apparatus executing drive control of the internal combustion engine and the motor according to a planned control schedule, the apparatus comprising:
   a travel information record section configured
      (i) to collect in association with travel of the vehicle an amount of requirement electrical power, which is required when the battery is used as the power source, for a plurality of predetermined road sections and
      (ii) to record in a storage device the collected amount of requirement electrical power for each of the plurality of predetermined road sections;
   a requirement power determination section configured
      (i) to acquire from the storage device an amount of requirement electrical power relative to each of the plurality of predetermined road sections included in a planned travel course, which is specified by the planned control schedule, and
      (ii) to make a requirement determination as to whether the planned travel course includes a road section where an amount of requirement electrical power is greater than a requirement-related threshold value; and
   a drive management section configured
      (i) to make a reconsideration of the drive control, which is to be executed according to the planned control schedule, when it is determined that the planned travel course includes the road section where the amount of requirement electrical power is greater than the requirement-related threshold value, and
      (ii) to prohibit the reconsideration of the drive control, which is to be executed according to the planned control schedule, when it is determined that the planned travel course includes no road section where the amount of requirement electrical power is greater than the requirement-related threshold value.

6. The control apparatus according to claim 5, further comprising:
   a deviation determination section configured to make a deviation determination as to whether with respect to a road section in the planned travel course a deviation in the amounts of requirement electrical power recorded in the storage device is less than a deviation-related threshold value,
   the drive management section being further configured,
      (i) to make the reconsideration of the drive control, which is to be executed according to the planned control schedule,
         when, while the requirement power determination section determines that the planned travel course includes a road section where an amount of requirement electrical power is greater than the requirement-related threshold value, the deviation determination section determines that with respect to the road section having the amount of requirement electrical power being greater than the requirement-related threshold value, a deviation in amounts of requirement electrical power recorded in the storage device is less than the deviation-related threshold value, and
      (ii) to prohibit the reconsideration of the drive control, which is to be executed according to the control schedule,
         when, although the requirement power determination section determines that the planned travel course includes a road section where an amount of requirement electrical power is greater than the requirement-related threshold value, the deviation determination section determines that, with respect to the road section having the amount of requirement electrical power being greater than the requirement-related threshold value, a deviation in amounts of requirement electrical power recorded in the storage device is not less than the deviation-related threshold value.

7. The control apparatus according to claim 5,
   wherein the control schedule is specified using a control index indicating a residual amount of the battery,
   the apparatus further comprising:
   a difference determination section configured to make a difference determination as to whether a difference between a maximum value and a minimum value in the control index with respect to the planned travel course is greater than a difference-related threshold value,
   the requirement power determination section being further configured to make the requirement determination as to whether the planned travel course includes a road section where an amount of requirement electrical power is greater than the requirement-related threshold value when the difference determination section determines that the difference between the maximum value and the minimum value is greater than the difference-related threshold value.

8. A drive control apparatus for a hybrid vehicle that travels using an internal combustion engine and a motor as power sources for a travel, the apparatus executing a drive control of the internal combustion engine and the motor according to a planned control schedule in association with a travel course, the apparatus comprising:
   a speed detector configured to detect a speed of the vehicle;
   a travel information record section configured to collect a speed of the vehicle every predetermined road section in association with a travel of the vehicle and record the collected speeds in a storage device;
   a speed determination section configured to make a speed determination during traveling the travel course as to whether a difference between (i) a speed presently detected in a road section by the speed detector and (ii) a past speed, which is recorded in the storage device with respect to the identical road section, is greater than a predetermined speed-related threshold value; and
   a drive management section configured
      (i) to make a reconsideration of the drive control, which is to be executed according to the planned control schedule, when the speed determination section determines that the difference between the speed presently detected by the speed detector and the past speed recorded in the storage device with respect to the identical road section is greater than the speed-related threshold value, and
      (ii) to prohibit a reconsideration of the drive control, which is to be executed according to the planned control schedule, when the speed determination section determines that the difference between the speed detected presently by the speed detector and the past speed recorded in the storage device with respect to the identical road section is not greater than the speed-related threshold value.

9. The drive control apparatus according to claim 1, the drive management section being further configured to make the reconsideration of the drive control, which is to be executed according to the planned control schedule, by executing a re-plan of the planned control schedule.

10. The drive control apparatus according to claim 1, further comprising:
a drive control device configured to execute a drive control of the internal combustion engine and the motor,
the drive management section being further configured to make the reconsideration of the drive control, which is to be executed according to the planned control schedule, by amending control information outputted to the drive control device so as to meet the planned control schedule.

11. The drive control apparatus according to claim 1, further comprising:
a route retrieval section configured to retrieve a route to a previously designated destination, wherein:
the planned travel course includes the route retrieved by the route retrieval section; and
the drive control is to be executed according to the control schedule planned along the route retrieved by the route retrieval section.

12. The drive control apparatus according to claim 1, wherein:
the control schedule is specified using a control index indicating a residual amount of the battery; and
the control index is defined as a planned control index with respect to each of the road sections included in the planned travel course,
the apparatus further comprising:
a separation determination section configured to make a separation determination as to whether, with respect to each of the road sections included in the travel course, a separation gap between a planned control index and a present control index presently taking place is greater than a separation-related threshold value,
the drive management section being further configured, only when the separation determination section determines that the separation gap between the planned control index and the present control index is greater than the separation-related threshold value,
(i) to make the reconsideration of the drive control, which is to be executed according to the planned control schedule, or
(ii) to prohibit the reconsideration of the drive control, which is to be executed according to the planned control schedule.

* * * * *